United States Patent [19]

Miyoshi et al.

[11] Patent Number: 5,034,271

[45] Date of Patent: Jul. 23, 1991

[54] MAGNETIC RECORDING MEDIUM

[75] Inventors: Takahito Miyoshi; Hiroo Inaba; Kazuko Hanai; Yasuyuki Yamada, all of Kanagawa, Japan

[73] Assignee: Fuji Photo Film Co., Ltd., Kanagawa, Japan

[21] Appl. No.: 184,539

[22] Filed: Apr. 21, 1988

Related U.S. Application Data

[63] Continuation-in-part of Ser. No. 21,056, Mar. 2, 1987, abandoned.

[30] Foreign Application Priority Data

Feb. 28, 1986 [JP] Japan .................................. 61-43808
Feb. 28, 1986 [JP] Japan .................................. 61-43809
Feb. 28, 1986 [JP] Japan .................................. 61-43810

[51] Int. Cl.$^5$ ............................................. G11B 23/00
[52] U.S. Cl. ................................... 428/323; 428/329; 428/408; 428/425.9; 428/694; 428/695; 428/900
[58] Field of Search ............. 428/323, 425.9, 500, 428/694, 900, 695, 329, 408; 427/128

[56] References Cited

U.S. PATENT DOCUMENTS

| | | | |
|---|---|---|---|
| 4,152,485 | 5/1979 | Mizumura et al. | 428/900 |
| 4,420,531 | 12/1983 | Tokuda | 428/694 |
| 4,420,532 | 12/1983 | Yamaguchi et al. | 428/694 |
| 4,448,842 | 5/1984 | Yamaguchi et al. | 428/694 |
| 4,521,486 | 6/1985 | Ninomiya et al. | 428/900 |
| 4,529,661 | 7/1985 | Ninomiya et al. | 428/425.9 |
| 4,613,545 | 9/1986 | Chubachi et al. | 428/900 |
| 4,615,949 | 10/1986 | Yoda et al. | 428/425.9 |
| 4,656,089 | 4/1987 | Ninomiya et al. | 428/694 |
| 4,666,784 | 5/1987 | Inukai et al. | 428/900 |
| 4,716,077 | 12/1987 | Okita et al. | 428/695 |

Primary Examiner—Paul J. Thibodeau
Attorney, Agent, or Firm—Sughrue, Mion, Zinn, Macpeak & Seas

[57] ABSTRACT

An improved magnetic recording medium comprises a nonmagnetic support and a magnetic recording layer which comprises a ferromagnetic powder, a lubricant and an abrasive dispersed in a binder comprising a specific polyurethane resin and a specific vinyl chloride copolymer at a ratio (polyurethane resin:vinyl chloride copolymer) in the range of 15:85 to 90:10. The polyurethane resin has a polar group such as —COOM, —SO$_3$M, —OSO$_3$M and —PO(OM')$_2$, wherein M is hydrogen or an alkali metal atom, and M' is hydrogen, an alkali metal atom or a lower hydrocarbon group, one polar group being contained per 53,000 to 100,000 of the number-average molecular weight of the resin, and the vinyl chloride copolymer has one of the above-mentioned polar group, one polar group unit being contained per 10,000 to 100,000 of the number-average molecular weight of the copolymer. The recording layer contains a fatty acid ester lubricant having a low melting point, a carbon black having an average particle size of 90–150 μm, and/or a α-alumina having a small average particle size.

8 Claims, No Drawings

MAGNETIC RECORDING MEDIUM

This is a continuation of application Ser. No. 07/021,056 filed Mar. 2, 1987 now abandoned.

BACKGROUND OF THE INVENTION

1. Field of the invention

The present invention relates to a novel magnetic recording medium.

2. Background of the invention

A magnetic recording medium basically comprises a nonmagnetic support and a magnetic recording layer provided on the support, and the magnetic recording layer generally comprises a ferromagnetic powder, an abrasive, a lubricant, etc. dispersed in a binder. As the binder, a polyurethane resin and a vinyl chloride copolymer are known. Such binder affords to impart mechanical strength and moderate flexibility to the magnetic recording layer, and affords to form a magnetic recording layer inherently excellent in various properties such as electromagnetic conversion characteristics, running endurance and running property.

Recently, a demand for a higher density recording system has increased, and hence a conventional iron oxide-type ferromagnetic powder has been replaced with a modified iron oxide-type ferromagnetic powder such as an iron oxide-type ferromagnetic power containing other component such as cobalt, and further replaced with a ferro-magnetic metal powder. In addition, a particle size of the ferromagnetic powder is more minimized. As the particle size is minimized, the ferromagnetic powder is liable to be poorly dispersed in the binder. For this reason, there is brought about a problem, that is, the aimed electromagnetic conversion characteristics of the resulting magnetic recording medium can be hardly obtained in spite of using such minimized ferromagnetic powder.

For coping with the problem, an invention relating to employment of a resin incorporated with a polar group as a binder component of the magnetic recording layer is applied for a patent, and the application has been laid open to public inspection (Japanese Patent Provisional Publications No. 57(1982)-92422 and No. 59(1984)-40320).

Japanese Patent Provisional Publication No. 57(1982)-92422 discloses a magnetic recording medium comprising a magnetic recording layer which contains as a binder component a polyurethane resin or a polyester resin having a molecular weight of 200-50,000 per one hydrophilic group (polar group) unit which is selected from the group consisting of $-OSO_3M$, $-COOM$ and $-PO(OM')_2$, wherein M is hydrogen or alkali metal, and M' is hydrogen, alkali metal or a hydrocarbon group.

Japanese Patent Provisional Publication No. 59(1984)-40320 discloses a magnetic recording medium using as a binder component of the magnetic recording layer a polyurethane resin having at least one polar group selected from the group consisting of $-COOM$ and $-PO(OM')_2$ in combination with a vinyl chloride copolymer having at least one polar group selected from the group consisting of $-COOM$, $-SO_3M$, $-OSO_3M$ and $-PO(OM')_2$ or a polyester resin having at least one polar group selected from the group consisting of $-COOM$ and $-PO(OM')_2$, wherein M and M' have the same meanings as defined above. In more detail, it is described in the publication that the polyurethane resin preferably has a molecular weight of 2,000-50,000 per said one polar group (hydrophilic polar group) introduced into the polyurethane resin, and if the molecular weight thereof exceeds 50,000, the ferromagnetic powder is poorly dispersed in the binder. Further, in the magnetic recording medium described in the publication, the above-mentioned polar group is contained in the resin component of the magnetic recording layer with high density, that is, the number-average molecular weight of the resin component is not more than 10,000 per one polar group unit.

As a result of studies on the inventions disclosed in those publications, the present inventors have found that the magnetic recording layer prepared using a polyurethane resin incorporated with a polar group in the above-specified range is excellent in various properties such as surface glossiness and squareness ratio as compared with a magnetic recording layer prepared using a conventional polyurethane resin not incorporated with a polar group. It has been also confirmed that the surface of the magnetic recording layer prepared using the polyurethane resin incorporated with the polar group shows a friction coefficient ($\mu$ value) of very low level, but the $\mu$ value thereof excessively increases after the repeated running of the resulting magnetic recording medium.

The increase of the friction coefficient of the surface of the magnetic recording layer with the repeated running means to undergo deterioration on various properties required for a magnetic recording medium such as electromagnetic conversion characteristics. The magnetic recording medium is generally employed repeatedly, so that such increase of the friction coefficient is desired to be as small as possible.

The magnetic recording medium generally contains a lubricant in the magnetic recording layer for enhancing running property of the medium. For instance, dimethylsilicone is employed as the lubricant as described in the above-mentioned Japanese Patent Provisional Publications 57(1982)-92422 and 59(1984)-40320.

However, according to study of the present inventors, employment of only the lubricant cannot restrain the increase of friction coefficient given after the repeated running, although it is possible to adjust the friction coefficient immediately after the preparation of the magnetic recording layer by varying the kind of the lubricant.

SUMMARY OF THE INVENTION

It is an object of the present invention to provide a magnetic recording medium which is reduced in the variation of the friction coefficient of the surface of the magnetic recording layer even after the repeated running, and hence is capable of retaining excellent properties such as high electromagnetic conversion characteristics for a long period of time.

It is another object of the invention to provide a magnetic recording medium which is improved in the dispersibility of a ferromagnetic powder in the magnetic recording layer and shows a high running property.

In one aspect, there is provided by the present invention a magnetic recording medium comprising a nonmagnetic support and a magnetic recording layer provided on the support, said magnetic recording layer comprising a ferromagnetic powder, a lubricant and an abrasive, dispersed in a binder comprising a polyurethane resin and a vinyl chloride copolymer at a ratio (polyurethane resin : vinyl chloride copolymer) in the range of 15:85 to 90:10, by weight, wherein:

said polyurethane resin has at least one polar group selected from the group consisting of —COOM, —SO$_3$M, —OSO$_3$M and —PO(OM')$_2$, wherein M is hydrogen or an alkali metal atom, and M' is hydrogen, an alkali metal atom or a lower hydrocarbon group, one polar group being contained per 53,000 to 100,000 of the number-average molecular weight of the polyurethane resin;

said vinyl chloride copolymer having at least one polar group selected from the group consisting of —COOM, —SO$_3$M, —OSO$_3$M and —PO(OM')$_2$, wherein M is hydrogen or an alkali metal atom, and M' is hydrogen, an alkali metal atom or a lower hydrocarbon group, one polar group unit being contained per 1,000 to 100,000 of the number-average molecular weight of the vinyl chloride copolymer; and said lubricant contains a fatty acid ester having a melting point of not higher than 30° C.

In another aspect, the present invention provides a magnetic recording medium comprising a nonmagnetic support and a magnetic recording layer provided on the support, said magnetic recording layer comprising a ferromagnetic powder, a lubricant and an abrasive. dispersed in a binder comprising a polyurethane resin and a vinyl chloride copolymer at a ratio (polyurethane resin : vinyl chloride copolymer) in the range of 15:85 to 90:10, by weight, wherein:

said polyurethane resin has at least one polar group selected from the group consisting of —COOM, —SO$_3$M, —OSO$_3$M and —PO(OM')$_2$, wherein M and M' have the same meanings as above, one polar group being contained per 53,000 to 100,000 of the number-average molecular weight of the polyurethane resin;

said vinyl chloride copolymer having at least one polar group selected from the group consisting of —COOM, —SO$_3$M, —OSO$_3$M and —PO(OM')$_2$, wherein M and M' have the same meanings as above, one polar group unit being contained per 1,000 to 100,000 of the number-average molecular weight of the vinyl chloride copolymer; and said magnetic recording layer further contains carbon black having an average particle size in the range of 90 to 150 mμ.

In a further aspect, the present invention provides a magnetic recording medium comprising a nonmagnetic support and a magnetic recording layer provided on the support, said magnetic recording layer comprising a ferro-magnetic powder, a lubricant and an abrasive, dispersed in a binder comprising a polyurethane resin and a vinyl chloride copolymer at a ratio (polyurethane resin : vinyl chloride copolymer) in the range of 15:85 to 90:10, by weight, wherein:

said polyurethane resin has at least one polar group selected from the group consisting of —COOM, —SO$_3$M, —OSO$_3$M and —PO(OM')$_2$, wherein M and M' have the same meanings as above, one polar group being contained per 53,000 to 100,000 of the number-average molecular weight of the polyurethane resin;

said vinyl chloride copolymer having at least one polar group selected from the group consisting of —COOM, —SO$_3$M, —OSO$_3$M and —PO(OM')$_2$, wherein M and M' have the same meanings as above, one polar group unit being contained per 1,000 to 100,000 of the number-average molecular weight of the vinyl chloride copolymer; and said abrasive is α-alumina having an average particle size of not more than 0.5 μm.

The magnetic recording medium of the present invention uses a combination of a polyurethane resin containing a specific amount of polar group and a vinyl chloride copolymer in combination with a fatty acid ester lubricant having a low melting point, carbon black having an average particle size of 90–150 mμ, and/or α-alumina having a small average particle size, whereby the friction coefficient (μ value) of the surface of the magnetic recording layer can be maintained at a fixed level. The variation of μ value is reduced even after the magnetic recording medium is used for a long period of time, and accordingly excellent properties of the magnetic recording medium of the invention can be kept for a long period of time.

DETAILED DESCRIPTION OF THE INVENTION

A magnetic recording medium of the invention basically comprises a nonmagnetic support and a magnetic recording layer provided on the support.

As a material of the nonmagnetic support, there can be mentioned those conventionally employed. Examples of the nonmagnetic support material include synthetic resin films such as films of polyethylene terephthalate, polypropylene, polycarbonate, polyethylene naphthalate, polyamide, polyamideimide, and polyimide; and metallic foils such as aluminum foil and stainless steel foil. The thickness of the nonmagnetic support is generally in the range of from 3 to 50 μm, preferably in the range of from 5 to 30 μm.

The nonmagnetic support may have a back layer (or backing layer) on the opposite side of the side where a magnetic recording layer is to be coated.

The magnetic recording layer comprises a ferromagnetic powder, a lubricant and an abrasive, dispersed in a binder.

As a ferromagnetic powder employable in the invention, there can be mentioned those generally employed. Examples of the ferromagnetic powder include a ferromagnetic metal powder mainly containing iron, a modified metal oxide-type ferromagnetic powder such as a powder of Co-modified iron oxide, modified barium ferrite or modified strontium ferrite, and a metal oxide-type ferromagnetic powder such as a powder of γ-Fe$_2$O$_3$ or Fe$_3$O$_4$.

As a typical ferromagnetic metal powder, there can be mentioned a ferromagnetic alloy powder containing a metal component of at least 75 wt. % in which at least 80 wt. % of the metal component comprises at least one ferromagnetic metal or metal alloy (e.g., Fe, Co, Ni, Fe-Co, Fe-Ni, Co-Ni, Fe-Zn-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta. W, Re, Au, Hg, Pb, Bi, La, Ce, Pr, Nd, B, or P). The ferromagnetic metal component may contain a small amount of water, hydroxide, or oxide. Processes for the preparation of those ferromagnetic metal powders are already known, and the ferromagnetic metal powder which is an example of the ferromagnetic powders employable in the invention can be prepared by the known processes.

Processes for the preparation of the metal oxide-type ferromagnetic powder or the modified metal oxide-type ferromagnetic powder are also known, and those processes can be applied to the preparation of a ferromagnetic powder employed in the invention.

There is no specific limitation on the shape of the ferromagnetic powder employable in the invention, but generally used is a ferromagnetic powder in a needle shape, grain shape, dice shape, rice shape or plate shape.

In the case of using a modified metal oxide-type ferromagnetic powder in the invention, Co-containing $\gamma$-Fe$_2$O$_3$ is preferred from the viewpoint of affinity for a resin component employed for the formation of a binder, and the minimized Co-containing $\gamma$-Fe$_2$O$_3$ having a specific surface area (S-BET) of not less than 35 m$^2$/g is advantageously employed in the invention.

According to the present invention, the dispersibility of the minimized ferromagnetic metal powder in the magnetic recording layer can be effectively improved, so that the invention is advantageously applied to a magnetic recording medium using a ferromagnetic metal powder having a specific surface area (S-BET) of not less than 45 m$^2$/g.

In one aspect, the magnetic recording layer according to the invention further contains a fatty acid ester having a melting point of not higher than 30° C. In the case of using a fatty acid ester having a melting point of higher than 30° C., the friction coefficient of the surface of the magnetic recording layer cannot be decreased immediately after the preparation of the recording layer. Further, satisfactory lubricating action can be hardly obtained, for instance, a contact noise caused by the contact between the magnetic recording layer and a magnetic head cannot be reduced.

Examples of the fatty acid ester having a melting point of not higher than 30° C. include methyl myristate, ethyl myristate, propyl myristate, methyl palmitate, ethyl palmitate, propyl palmitate, amyl palmitate, octyl palmitate, dodecyl palmitate, propyl stearate, butyl stearate, butoxyethyl palmitate, butoxyethyl stearate, and an ester of unsaturated fatty acid such as an oleic acid and having a melting point of not higher than 30° C. (e.g., ethyl oleate and propyl oleate). Among them, preferably employed are butyl myristate, methyl myristate, butyl stearate. ethyl palmitate, butoxyethyl palmitate and butoxyethyl stearate. These fatty acid esters can be employed singly or in combination.

The above-mentioned fatty acid ester can be employed alone as a lubricant, but it is particularly preferred to employ the above-mentioned fatty acid ester in combination with a fatty acid lubricant.

In the case of using the combination of the fatty acid ester and the fatty acid, a fatty acid having 12-22 carbon atoms is preferably employed in the invention.

Examples of the fatty acid having 12-22 carbon atoms include myristic acid, pentadecylic acid, palmitic acid, stearic acid, nonadecanic acid, arachic acid, behenic acid, oleic acid, elaidic acid, setoleic acid, erycic acid, linoleic acid and linolenic acid. The fatty acid can be employed singly in combination with the fatty acid ester, but two or more kinds of fatty acids having different lubricating properties given by their different chemical or physical characteristics such as chemical structure and melting point are preferably employed in combination with the fatty acid ester. Examples of the combination of two or more fatty acids include a combination of two kinds of fatty acids having a difference by not less than 20° C. on the melting point therebetween, and a combination of a saturated fatty acid and an unsaturated fatty acid. An example of such combinations is a combination of oleic acid and stearic acid. Since a magnetic recording medium is generally subjected to running procedures under various running conditions, plural kinds of fatty acids are selectively combined to meet the various conditions.

The lubricant is generally contained in the recording layer in an amount of 0.1 to 10 parts by weight, preferably 1 to 5 parts by weight, based on 100 parts by weight of the employed ferromagnetic powder. In the case of using both the fatty acid ester and the fatty acid, the total amount thereof is in the above-defined range. The ratio between the fatty acid ester and the fatty acid is generally in the range of from 1:9 to 9:1 (fatty acid ester : fatty acid, by weight).

When the amount of the lubricant is less than 0.1 part by weight, the effect given by addition of the lubricant is unsatisfactory, and hence not only sufficient lubricating action of the lubricant cannot be obtained (for instance, contact noise increases by the contact between the magnetic recording layer and a magnetic head), but also the friction coefficient of the surface of the magnetic recording layer increases after the repeated running of the recording medium. When the amount of the lubricant exceeds 10 parts by weight, the lubricant is excessively supplied onto the surface of the magnetic recording layer, resulting deposition of dust on the surface of the recording layer.

The above-mentioned fatty acid ester lubricant can be replaced with carbon black having an average particle size in the range of 90-150 m$\mu$ or a combination of said carbon black and other lubricants such as silicone oil. It is difficult to disperse a carbon black having an average particle size of smaller than 90 m$\mu$ uniformly in the recording layer. Accordingly, effective decrease of friction coefficient ($\mu$ value) just after the preparation of the recording layer is not expected. Further, the increase of $\mu$ value after the repeated running is not low. A carbon black having an average particle size of larger than 150 m$\mu$ is not effective to decrease the initial $\mu$ value of the resulting recording layer.

The carbon black can be advantageously contained in the magnetic recording layer of the invention even alone.

The carbon black is generally contained in the magnetic recording layer in an amount of not more than 5.0 weight parts, preferably 0.5 to 5.0 weight parts, per 100 weight parts of the ferromagnetic powder. Incorporation of a large amount of carbon black is not advantageous.

A typical example of the silicone oil lubricant preferably employable is a dimethylsilicone oil having a viscosity of 100 to 100,000 cSt. A fatty acid-modified silicone compound can be also employed. The silicone oil or silicone compound can be incorporated in the recording layer in an amount of 0.1 to 5 weight parts per 100 weight parts of the ferromagnetic powder.

The magnetic recording layer of the recording medium of the invention contains an abrasive such as chromium oxide, $\alpha$-ferric oxide, silica or $\alpha$-alumina. The abrasive preferably has an average particle size of not larger than 0.5 $\mu$m, preferably 0.3 to 0.5 $\mu$m. The abrasive is generally contained in the recording layer in an amount of 0.1 to 10 weight parts per 100 weight parts of the ferromagnetic powder. Most preferred abrasive is $\alpha$-alumina which, in combination with the specific binder polymer of the invention, gives prominent decrease of $\mu$ value, as compared with other abrasive. In the case of using chromium oxide abrasive, a silicone compound lubricant is preferably employed in combination.

The above-mentioned ferromagnetic powder, lubricant and abrasive are dispersed in a binder.

The binder comprises a polyurethane resin having a specific polar group and a vinyl chloride copolymer having a specific polar group.

In the invention, the employment of a polyurethane resin having a number-average molecular weight of 53,000–100,000 per one polar group (and preferably with the employment of the above-mentioned fatty acid in combination) reduces the friction coefficient of the magnetic recording layer just after the preparation of the recording layer, and further restrains increase of the friction coefficient after the repeated running of the recording medium. The reason has not been clarified yet, but both the lubricant, carbon black or α-amumina and the specific polyurethane resin act together to improve the dispersibility of the ferromagnetic powder. Further by the lubricating action of the fatty acid ester (and preferably together with the fatty acid), or carbon black, a magnetic recording layer having a low friction coefficient can be prepared. In the magnetic recording medium of the invention, lubricating efficiency of the fatty acid ester (and the fatty acid) or carbon black is high, and the excellent property inherently attached to polyurethane resin is well retained because the polar group is not excessively contained in the resin. From these viewpoints, it is presumed that a variation on the surface of the magnetic recording layer is less produced even by the contact between the recording layer and a magnetic head, and accordingly the friction coefficient of the surface of the recording layer hardly varies even after the running procedure of the medium for a long period of time.

The resin component of the invention contains the specific polyurethane resin and may contain other polymer (or resin) such as vinyl chloride copolymer which may contain a polar group.

For lowering the density of polar group in the resin component containing a polyurethane resin having a polar group, various methods can be employed. A method of using a polyurethane resin having a low density of polar group to adjust the density of polar group in the whole resin component is preferably employed from the viewpoint of accomplishment of the objects of the invention.

Accordingly, a method of adjusting the density of polar group in the whole resin component by using a polyurethane resin having a low density of polar group, which is the most preferred method, is mainly described hereinafter to further illustrate the present invention.

The polar group to be incorporated into the polyurethane resin is selected from —COOM, —SO$_3$M, —OSO$_3$M and —PO(OM')$_2$. wherein M and M' have the same meanings as defined hereinbefore. The above-mentioned polar group can be introduced into the polyurethane resin singly or in combination.

The polyurethane resin employed in the invention preferably has the above-mentioned one polar group based on its number-average molecular weight of 53,000–100,000.

A polyurethane resin conventionally employed as a binder component of a magnetic recording layer has a number-average molecular weight ranging from 200 (or 2,000) to 50,000 per one polar group. A magnetic recording layer prepared by using such polyurethane resin shows low friction coefficient ($\mu$ value) immediately after the preparation of the recording layer. However, the $\mu$ value gradually increases as the recording medium is run for a long time, and finally various properties required for a magnetic recording medium such as electromagnetic conversion characteristics tend to deteriorate.

For instance, in the case of using a polyurethane resin having a number-average molecular weight of 28,000 per one polar group, the $\mu$ value of the resulting magnetic recording layer after the repeated running of 60 times increases by approx. 15% as compared with the $\mu$ value of the magnetic recording layer just after the first running.

On the other hand, a combination of a polyurethane resin adjusted to have a number-average molecular weight of 53,000–100,000 per one specific polar group and the aforementioned fatty acid ester, carbon black, or α-alumina is employed in the invention, whereby increase of the $\mu$ value of the surface of the magnetic recording layer can be effectively restrained.

The polar group contained in the polyurethane resin varies in the affinity for the ferromagnetic powder depending upon its kind. Accordingly, the polar group is appropriately selected in consideration of the affinity for the ferromagnetic powder. For instance, a polyurethane resin having —COOH is suitably employed in the case of using Co-containing Fe$_2$O$_3$ as a ferromagnetic powder, and a polyurethane resin having —SO$_3$Na is suitably used in the case of using a ferromagnetic metal powder.

The polyurethane resin employable in the invention per se generally has a number-average molecular weight ranging from 10,000 to 100,000, preferably from 12,000 to 60,000.

Accordingly, the polyurethane resin employable in the invention may be a mixture of a polyurethane resin having a polar group and a polyurethane resin having no polar group.

Examples of the vinyl chloride copolymers to be used in combination with the above-stated polyurethane resin include a vinyl chloride/vinyl acetate copolymer, a vinyl chloride/vinyl acetate/vinyl alcohol copolymer, a vinyl chloride/vinyl acetate/acrylonitrile copolymer, and a vinyl chloride/vinylidene chloride copolymer. The vinyl chloride copolymer has a polar group selected from the group consisting of —COOM, —SO$_3$M, —OSO$_3$M and —PO(OM')$_2$, wherein M and M' have the same meanings as defined hereinbefore, and particularly preferred is a vinyl chloride copolymer having —COOH or —SO$_3$Na as a polar group. The vinyl chloride copolymer has one polar group based on the number-average molecular weight ranging from 1,000 to 100,000.

The number-average molecular weight of the vinyl chloride copolymer per se is generally in the range of 10,000 to 100,000.

The ratio between the vinyl chloride copolymer and the polyurethane resin is generally in the range of 15:85 to 90:10 (polyurethane resin : vinyl chloride copolymer, by weight), preferably 70:30 to 30:70.

The aforementioned polyurethane resin can be prepared, for instance, by the following process.

A polyurethane resin is generally produced by reaction of a polyisocyanate compound with a polyol component. As the polyol component, there is generally used polyester polyol which is produced by a reaction of polyol with a polybasic acid.

The above-described conventional process can be applied to the preparation of a polyurethane resin having the specific polar group employable in the invention. In more detail, a polybasic acid having a specific polar group as a portion of the polybasic acid is used to prepare polyester polyol, and the obtained polyester polyol is caused to react with a polyisocyanate compound to prepare a polyurethane resin.

As the above-mentioned polyol having a polar group or polybasic acid having a polar group employed for introducing a polar group into the polyurethane resin, there can be mentioned dimethylol propionic acid, sodium salts thereof, potassium salts thereof, 5-sulfoisophthalic acid, 2-sulfoisophthalic acid, 4-sulfophthalic acid, 3-sulfophthalic acid, dialkyl 5-sulfoisophthalate, dilkayl 2-sulfoisophthalate, alkyl 4-sulfophthalate, alkyl 3-sulfophthalate, sodium salts thereof, and potassium salts thereof. .

Examples of the polyol component having no polar group include trimethylolpropane, hexanetriol, glycerol, trimethylolethane, neopentyl glycol, pentaerythritol, ethylene glycol, propylene glycol, butylene glycol and diethylene glycol. Examples of the polybasic acid having no polar group include polycaprolactone, phthalic acid, isophthalic acid, terephthalic acid, adipic acid, dimerized linolenic acid, sebacic acid, and maleic acid.

The polyester polyol having a specific polar group obtained as above is adjusted to generally have a number-average molecular weight ranging from 500 to 8,000.

Examples of the polyisocyanate compound include a reaction product of 3 moles of diisocyanate (e.g., diphenylmethane-4,4'-diisocyanate, tolylene diisocyanate, or xylylene diisocyanate) and 1 mol of trimethylolpropane, a buret adduct compound of S moles of hexamethylene diisocyanate, an isocyanurate compound of 5 moles of tolylene diisocyanate, an isocyanurate adduct compound of moles of tolylene diisocyanate and 2 moles of hexamethylene diisocyanate, and a polymer of diphenylmethane diisocyanate.

For synthesizing a polyurethane resin employable in the invention, the above-mentioned components (polyol having a polar group, polybasic acid having a polar group and polyisocyanate compound) are mixed in such a manner that the number-average molecular weight per one polar group would be in the above-defined range, and the mixture is subjected to reaction. Otherwise, a polyurethane resin having high density of polar group is first prepared, and the obtained polyurethane resin is diluted with a polyurethane resin having no polar group to prepare an aimed polyurethane resin having a density of polar group in the above-defined range.

The aforementioned vinyl chloride copolymer having the specific polar group can be prepared according to a known method. For instance, vinyl chloride is caused to react with a compound having a reactive double bond and a polar group such as maleic anhydride, (meth)acrylic acid and 2-(meth) acrylamide-2-methylpropionic acid, 2-(meth)-acrylamide-2-methylpropane sulfonic acid, vinyl sulfonic acid. sodium salts or potassium salts thereof, (meth)-acrylic acid-? -ethyl sulfonate, sodium salts or potassium salts thereof, and (meth)acrylic acid-2-ethyl phosphate. In this reaction, a vinyl acetate monomer, etc. may be appropriately incorporated together to denature the resulting copolymer.

Methods for incorporation of the polar group into the polyurethane resin and the vinyl chloride copolymer are described, for instance, in Japanese Patent Publications 54(1979)-157603 and 58(1983)-41565, and Japanese Patent Provisional Publications 57(1982)-44227, 57(1982)-2422, 57(1982)-92423, 58(1983)-108032, 59(1984)-8127 and 60(1985)-101161. These methods can be also utilized in the present invention.

In the preparation of a magnetic recording layer according to the invention, a polyisocyanate compound is preferably employed in combination with the aforementioned components. In this case, there can be employed the same polyisocyanate compound as that used in the preparation of the aforementioned polyurethane resin. The polyisocyanate compound serves as a curing agent to form a cross-linking structure, and hence the resulting magnetic recording layer has high mechanical strength.

In the case of using the polyisocyanate compound, the amount thereof is generally the same or not larger than the amount of the polyurethane resin.

The process for the preparation of a magnetic recording medium of the present invention is described below.

In the first place, the above-mentioned ferromagnetic powder, resin component, lubricant and other components such as an abrasive and a filler are kneaded with a solvent to prepare a magnetic paint. The solvent used in the kneading procedure can be selected from those generally employed in the preparation of a magnetic paint. Kneading of those components can be carried out according to the conventional manner, and the order of addition of those components can be appropriately determined.

Other known additives such as a dispersing agent and an antistatic agent can be added in the preparation of a magnetic paint.

In the second place, the magnetic paint prepared as above is applied to the aforementioned nonmagnetic support. The magnetic paint can be coated directly on the nonmagnetic support, but it is possible to provide an adhesive layer to combine the magnetic paint layer with the nonmagnetic support.

The magnetic recording layer has a thickness (after dryness) generally of 0.5 to 10 μm, preferably of 1.5 to 7.0 μm.

The magnetic recording layer provided on the nonmagnetic support is generally subjected to a treatment of orienting the ferromagnetic powder contained in the magnetic recording layer, that is, a magnetic orientation, and then subjected to a drying process. The dried magnetic recording layer is generally heated to cure the resin component in the layer, and then, if necessary, subjected to a surface smoothening process. The magnetic recording medium having been subjected to these processes such as the smoothening process is subjected to a blading treatment as desired, and then cut to give a medium having a desired shape.

The examples and the comparison examples of the present invention are given below. In the following examples, the expression "part(s)" means "part(s) by weight", unless otherwise specified.

EXAMPLE 1

The components indicated below were kneaded in a ball mill for 48 hours to give a homogeneous dispersion.

| | |
|---|---|
| Co-containing γ-$Fe_2O_3$ (specific surface area: 50.0 $m^2$/g) | 100 parts |
| Vinyl chloride copolymer | 12 parts |

-continued

| | |
|---|---|
| Polyurethane resin | 8 parts |
| Polyisocyanate compound (Colonate L, Available from Japan Polyurethane Co., Ltd.) | 8 parts |
| α-Al₂O₃ (mean particle size: 0.3 μm) | 4 parts |
| Oleic acid | 0.3 part |
| Stearic acid | 1 part |
| Butoxyethyl stearate (melting point: 22.5° C.) | 1.5 parts |
| Methyl ethyl ketone | 260 parts |

The above-described vinyl chloride copolymer was a vinyl chloride/vinyl acetate/maleic anhydride copolymer (400×110A, polymerization degree: 400, glass transition point: 75° C.; available from Nippon Geon Co., Ltd, Japan). The vinyl chloride/vinyl acetate/maleic anhydride copolymer had one —COOH group per 1,300 of the number-average molecular weight.

The above-described polyurethane resin was prepared by the following process.

2,000 g. of polycaprolactone polyol having a molecular weight of 2,000, 8.8 g. of dimethylol propionic acid, 410 g. of neopentyl glycol and 510 g. of diphenylmethane diisocyanate are caused to react with each other to prepare a polyurethane resin having a number-average molecular weight of 30,000. The obtained polyurethane resin had one —COOH group per 60,000 of the number-average molecular weight.

The aforementioned dispersion was filtered over a filter having mean pore size of 1 μm to give a magnetic paint. The magnetic paint was coated over a polyethylene terephthalate support (thickness: 10 μm) to give a coated layer of a thickness of 3.5 μm (thickness in dry state) by means of a reverse roll. The nonmagnetic support with the coated layer was treated with an electromagnet at 3,000 gauss under wet condition to give a magnetic orientation. After the coated layer was dried, the dried layer was subjected to supercalendering, heat treatment and blading treatment. The resulting sheet was slit into width of ½ inch to prepare a VHS type video tape.

The obtained video tape was examined on friction coefficient (μvalue) of the surface of the magnetic recording layer after the first running and after the running of 100 times, and contact noise according to the following tests. The results are set forth in Table 1.

Friction coefficient

The surface of the magnetic recording layer of the video tape was brought into contact with a stainless steel pole having an average surface roughness of 0.15 μm and a diameter of 5 mm in atmosphere of 25° C. and 65% RH, and the video tape was subjected to running at a rate of 1.4 cm/min with a pending weight of 20 g., to measure a friction coefficient of the surface of the magnetic recording layer.

Contact noise

The video tape was run on a video tape recorder (NV-8200, produced by Matsushita Electric Co., Ltd.) under a reproduction mode to read out the RF output by means of a root-mean-square value voltmeter, which was expressed by a term of dB. The video tape employed was a demagnetized unrecorded video tape.

EXAMPLE 2

The procedure of Example 1 was repeated except for using butyl stearate (melting point: 27° C.) instead of butoxyethyl stearate, to prepare a video tape.

The obtained video tape was examined on friction coefficient of the surface of the magnetic recording layer after the first running and after the repeated running of 100 times and contact noise according to the same tests as described in Example 1. The results are set forth in Table 1.

EXAMPLE 3

The procedure of Example 1 was repeated except for using ethyl palmitate (melting point: 25° C.) instead of butoxyethyl stearate, to prepare a video tape.

The obtained video tape was examined on friction coefficient of the surface of the magnetic recording layer after the first running and after the repeated running of 100 times and contact noise according to the same tests as described in Example 1. The results are set forth in Table 1.

EXAMPLE 4

The procedure of Example 1 was repeated except for using methyl myristate (melting point: 19° C.) instead of butoxyethyl stearate, to prepare a video tape.

The obtained video tape was examined on friction coefficient of the surface of the magnetic recording layer after the first running and after the repeated running of 100 times and contact noise according to the same tests as described in Example 1. The results are set forth in Table 1.

EXAMPLE 5

The procedure of Example 1 was repeated except for using butyl myristate (melting point: 3° C.) instead of butoxyethyl stearate, to prepare a video tape.

The obtained video tape was examined on friction coefficient of the surface of the magnetic recording layer after the first running and after the repeated running of 100 times and contact noise according to the same tests as described in Example 1. The results are set forth in Table 1.

EXAMPLE 6

The procedure of Example 1 was repeated except for preparing a polyurethane resin having a number-average molecular weight of 100,000 per one —COOH unit by using 4.9 g. of dimethylol propionic acid and 410 g. of neopentyl glycol and using the obtained polyurethane resin, to prepare a video tape.

The obtained video tape was examined on friction coefficient of the surface of the magnetic recording layer after the first running and after the repeated running of 100 times and contact noise according to the same tests as described in Example 1. The results are set forth in Table 1.

COMPARISON EXAMPLE 1

The procedure of Example 1 was repeated except for preparing a polyurethane resin having a number-average molecular weight of 45,000 per one —COOH unit by using 11 g. of dimethylol propionic acid and 410 g. of neopentyl glycol and using the obtained polyurethane resin, to prepare a video tape.

The obtained video tape was examined on friction coefficient of the surface of the magnetic recording layer after the first running and after the repeated running of 100 times and contact noise according to the same tests as described in Example 1. The results are set forth in Table 1.

COMPARISON EXAMPLE 2

The procedure of Example 1 was repeated except for preparing a polyurethane resin having a number-average molecular weight of 120,000 per one —COOH unit by using a g. of dimethylol propionic acid and 410 g. of neopentyl glycol and using the obtained polyurethane resin, to prepare a video tape.

The obtained video tape was examined on friction coefficient of the surface of the magnetic recording layer after the first running and after the repeated running of 100 times and contact noise according to the same tests as described in Example 1. The results are set forth in Table 1.

COMPARISON EXAMPLE 3

The procedure of Example 1 was repeated except for using ethyl stearate (melting point: 34° C.) instead of butoxyethyl stearate, to prepare a video tape.

The obtained video tape was examined on friction coefficient of the surface of the magnetic recording layer after the first running and after the repeated running of 100 times and contact noise according to the same tests as described in Example 1. The results are set forth in Table 1.

COMPARISON EXAMPLE 4

The procedure of Example 1 was repeated except for using ethyl behenate (melting point: 49° C.) instead of butoxyethyl stearate, to prepare a video tape.

The obtained video tape was examined on friction coefficient of the surface of the magnetic recording layer after the first running and after the repeated running of 100 times and contact noise according to the same tests as described in Example 1. The results are set forth in Table 1.

TABLE 1

| | | Contact Noise (dB) | Friction Coefficient ($\mu$) | |
|---|---|---|---|---|
| | | | After First Running | After 100-time Running |
| Example | 1 | −43.0 | 0.27 | 0.25 |
| Example | 2 | −42.0 | 0.29 | 0.25 |
| Example | 3 | −43.2 | 0.28 | 0.25 |
| Example | 4 | −42.5 | 0.26 | 0.26 |
| Example | 5 | −42.0 | 0.25 | 0.26 |
| Example | 6 | −43.0 | 0.27 | 0.27 |
| Com. Example | 1 | −38.0 | 0.28 | 0.45 |
| Com. Example | 2 | −40.0 | 0.32 | 0.40 |
| Com. Example | 3 | −38.0 | 0.33 | 0.30 |
| Com. Example | 4 | −39.0 | 0.35 | 0.30 |

EXAMPLE 7

The components indicated below are kneaded in a ball mill for 48 hours to give a homogeneous dispersion.

| | |
|---|---|
| Co-containing $\gamma$-Fe$_2$O$_3$ (specific surface area: 50.0 m$^2$/g) | 100 parts |
| Vinyl chloride copolymer | 14 parts |
| Polyurethane resin | 10 parts |
| Polyisocyanate compound (Colonate L, Available from Japan Polyurethane Co., Ltd.) | 5 parts |
| $\alpha$-Cr$_2$O$_3$ (mean particle size: 0.2 $\mu$m) | 4 parts |
| Carbon black (Asahi #35, average particle size 115 m$\mu$) | 2.5 parts |
| Dimethyl silicone oil | 2.5 parts |

-continued

| | |
|---|---|
| Methyl ethyl ketone | 260 parts |

The above-described vinyl chloride copolymer was a vinyl chloride/vinyl acetate/maleic anhydride copolymer (400×110A, polymerization degree: 400, glass transition point: 75° C.; available from Nippon Geon Co., Ltd. Japan). The vinyl chloride/vinyl acetate/maleic anhydride copolymer had one —COOH group per 1,300 of the number-average molecular weight.

The above-described polyurethane resin was prepared by the following process.

2,000 g. of polycaprolactone polyol having a molecular weight of 2,000, 9.7 g. of dimethylol propionic acid, 410 g. of neopentyl glycol and 510 g. of diphenylmethane diisocyanate are caused to react with each other to prepare a polyurethane resin having a number-average molecular weight of 30,000. The obtained polyurethane resin had one —COOH group (unit) per 55,000 of the number-average molecular weight.

The aforementioned dispersion was filtered over a filter having mean pore size of 1 $\mu$m to give a magnetic paint. The magnetic paint was coated over a polyethylene terephthalate support (thickness: 10 $\mu$m) to give a coated layer of a thickness of 3.5 $\mu$m (thickness in dry state) by means of a reverse roll. The nonmagnetic support with the coated layer was treated with an electromagnet at 3,000 gauss under wet condition to give a magnetic orientation. After the coated layer was dried, the dried layer was subjected to supercalendering, heat treatment and blading treatment. The resulting sheet was slit into width of ½ inch to prepare a VHS type video tape.

The obtained video tape was examined on friction coefficient ($\mu$ value) of the surface of the magnetic recording layer after the first running and after the running of 100 times, squareness ratio and Y·S/N ratio according to the following tests. The results are set forth in Table 2.

Friction coefficient

Same as described in Example 1.

Squareness ratio

Br/Bm value at Hm 5 KOe was measured using a vibrating sample flux meter (available from Toei Kogyo Co., Ltd.)

Y·S/N ratio

S/N ratio of a luminance signal at 4 MHz was measured using a reference tape (video tape prepared in the following Comparison Example 5) whose output level was made to 0 dB. The measurement was done by means of NV870 HD output level counter (produced by Matsushita Electric Co., Ltd.).

EXAMPLE 8

The procedure of Example 7 was repeated except for preparing a polyurethane resin having a number-average molecular weight of 70,000 per one —COOH unit by using 6.9 g. of dimethylol propionic acid and 410 g. of neopentyl glycol and using the obtained polyurethane resin and 2.0 parts of carbon black, to prepare a video tape.

The obtained video tape was examined on friction coefficient of the surface of the magnetic recording layer after the first running and after the repeated running of 100 times, squareness ratio and Y·S/N ratio according to the same tests as described in Example 7. The results are set forth in Table 2.

EXAMPLE 9

The procedure of Example 7 was repeated except for preparing a polyurethane resin having a number-average molecular weight of 100,000 per one —COOH unit by using 4.9 g. of dimethylol propionic acid and 410 g. of neopentyl glycol and using the obtained polyurethane resin and 2.0 parts of carbon black, to prepare a video tape.

The obtained video tape was examined on friction coefficient of the surface of the magnetic recording layer after the first running and after the repeated running of 100 times, squareness ratio and Y·S/N ratio according to the same tests as described in Example 7. The results are set forth in Table 2.

COMPARISON EXAMPLE 5

The procedure of Example 7 was repeated except for using 2 weight parts of carbon black (Thermax N-990, tradename of CANCARB CORP.) having an average particle size of 270 m$\mu$, to prepare a video tape.

The obtained video tape was examined on friction coefficient of the surface of the magnetic recording layer after the first running and after the repeated running of 100 times, squareness ratio and Y·S/N ratio according to the same tests as described in Example 7. The results are set forth in Table 2.

COMPARISON EXAMPLE 6

The procedure of Example 7 was repeated except for using 2 weight parts of carbon black (Valcan XC-72, tradename of CABBOT CORP.) having an average particle size of 30 m$\mu$, to prepare a video tape.

The obtained video tape was examined on friction coefficient of the surface of the magnetic recording layer after the first running and after the repeated running of 100 times, squareness ratio and Y·S/N ratio according to the same tests as described in Example 7. The results are set forth in Table 2.

COMPARISON EXAMPLE 7

The procedure of Example 7 was repeated except for using 5.5 weight parts of the carbon black to prepare a video tape.

The obtained video tape was examined on friction coefficient of the surface of the magnetic recording layer after the first running and after the repeated running of 100 times, squareness ratio and Y·S/N ratio according to the same tests as described in Example 7. The results are set forth in Table 2.

COMPARISON EXAMPLE 8

The procedure of Example 7 was repeated except for preparing a polyurethane resin having a number-average molecular weight of 45,000 per one —COOH unit by using 11 g. of dimethylol propionic acid and 410 g. of neopentyl glycol and using the obtained polyurethane resin, to prepare a video tape.

The obtained video tape was examined on friction coefficient of the surface of the magnetic recording layer after the first running and after the repeated running of 100 times, squareness ratio and Y·S/N ratio according to the same tests as described in Example 7. The results are set forth in Table 2.

COMPARISON EXAMPLE 9

The procedure of Example 7 was repeated except for preparing a polyurethane resin having a number-average molecular weight of 120,000 per one —COOH unit by using 4 g. of dimethylol propionic acid and 410 g. of neopentyl glycol and using the obtained polyurethane resin, to prepare a video tape.

The obtained video tape was examined on friction coefficient of the surface of the magnetic recording layer after the first running and after the repeated running of 100 times, squareness ratio and Y·S/N ratio according to the same tests as described in Example 7. The results are set forth in Table 2.

TABLE 2

| | | Squareness Ratio | Y · S/N (dB) | Friction Coefficient ($\mu$) | |
|---|---|---|---|---|---|
| | | | | After First Running | After 100-time Running |
| Example | 7 | 0.86 | +3 | 0.29 | 0.30 |
| Example | 8 | 0.86 | +3 | 0.29 | 0.30 |
| Example | 9 | 0.86 | +3 | 0.29 | 0.30 |
| Com. Ex. | 5 | 0.80 | 0 | 0.50 | 0.40 |
| Com. Ex. | 6 | 0.78 | −2 | 0.34 | 0.42 |
| Com. Ex. | 7 | 0.78 | −2 | 0.27 | 0.29 |
| Com. Ex. | 8 | 0.86 | +3 | 0.37 | 0.43 |
| Com. Ex. | 9 | 0.83 | +1 | 0.35 | 0.30 |

EXAMPLE 10

The components indicated below were kneaded in a ball mill for 48 hours to give a homogeneous dispersion.

| | |
|---|---|
| Co-containing $\gamma$-Fe$_2$O$_3$ (specific surface area: 50.0 m$^2$/g) | 100 parts |
| Vinyl chloride copolymer | 15 parts |
| Polyurethane resin | 10 parts |
| Polyisocyanate compound (Colonate L, Available from Japan Polyurethane Co., Ltd.) | 5 parts |
| $\alpha$-Al$_2$O$_3$ (mean particle size: 0.2 $\mu$m) | 5 parts |
| Carbon black (Asahi #35, average particle size 115 m$\mu$) | 2 parts |
| Oleic acid | 0.3 part |
| Stearic acid | 1.5 parts |
| Butyl stearate | 1 part |
| Methyl ethyl ketone | 250 parts |

The above-described vinyl chloride copolymer was a vinyl chloride/vinyl acetate/maleic anhydride copolymer (400×110A, polymerization degree: 400, glass transition point: 75° C.; available from Nippon Geon Co., Ltd, Japan). The vinyl chloride/vinyl acetate/-maleic anhydride copolymer had one —COOH group per 1,300 of the number-average molecular weight.

The above-described polyurethane resin was prepared by the following process.

2,000 g. of polycaprolactone polyol having a molecular weight of 2,000, 9.7 g. of dimethylol propionic acid, 410 g. of neopentyl glycol and 510 g. of diphenylmethane diisocyanate are caused to react with each other to prepare a polyurethane resin having a number-average molecular weight of 30,000. The obtained polyurethane resin had one —COOH group (unit) per 55,000 of the number-average molecular weight.

The aforementioned dispersion was filtered over a filter having mean pore size of 1 $\mu$m to give a magnetic paint. The magnetic paint was coated over a polyethylene terephthalate support (thickness: 10 $\mu$m) to give a coated layer of a thickness of 3.5 $\mu$m (thickness in dry state) by means of a reverse roll. The nonmagnetic support with the coated layer was treated with an electromagnet at 3,000 gauss under wet condition to give a magnetic orientation. After the coated layer was dried, the dried layer was subjected to supercalendering, heat treatment and blading treatment. The resulting sheet was slit into width of ½ inch to prepare a VHS type video tape.

The obtained video tape was examined on friction coefficient (μ value) of the surface of the magnetic recording layer after the first running and after the running of 100 times, and squareness ratio according to the aforementioned tests. The results are set forth in Table 3.

EXAMPLES 11–13

The procedure of Example 10 was repeated except for using α-Al₂O₃ of an average particle size of 0.3 μm (Example 11), 0.4 μm (Example 12) or 0.5 μm (Example 13) in place of α-Al₂O₃ of an average particle size of 0.2 μm, to prepare a video tape.

The obtained video tape was examined on friction coefficient of the surface of the magnetic recording layer after the first running and after the repeated running of 100 times, and squareness ratio. The results are set forth in Table 3.

EXAMPLE 14

The procedure of Example 10 was repeated except for preparing a polyurethane resin having a number-average molecular weight of 70,000 per one —COOH unit by using 6.9 g. of dimethylol propionic acid and 410 g. of neopentyl glycol, to prepare a video tape.

The obtained video tape was examined on friction coefficient of the surface of the magnetic recording layer after the first running and after the repeated running of 100 times, and squareness ratio. The results are set forth in Table 3.

EXAMPLE 15

The procedure of Example 10 was repeated except for preparing a polyurethane resin having a number-average molecular weight of 100,000 per one —COOH unit by using 4.9 g. of dimethylol propionic acid and 410 g. of neopentyl glycol, to prepare a video tape.

The obtained video tape was examined on friction coefficient of the surface of the magnetic recording layer after the first running and after the repeated running of 100 times, and squareness ratio. The results are set forth in Table 3.

COMPARISON EXAMPLE 10

The procedure of Example 10 was repeated except for preparing a polyurethane resin having a number-average molecular weight of 45,000 per one —COOH unit by using 11 g. of dimethylol propionic acid and 410 g. of neopentyl glycol, to prepare a video tape.

The obtained video tape was examined on friction coefficient of the surface of the magnetic recording layer after the first running and after the repeated running of 100 times, and squareness ratio. The results are set forth in Table 3.

COMPARISON EXAMPLE 11

The procedure of Example 10 was repeated except for preparing a polyurethane resin having a number-average molecular weight of 120,000 per one —COOH unit by using 4 g. of dimethylol propionic acid and 410 g. of neopentyl glycol, to prepare a video tape.

The obtained video tape was examined on friction coefficient of the surface of the magnetic recording layer after the first running and after the repeated running of 100 times, and squareness ratio. The results are set forth in Table 3.

COMPARISON EXAMPLE 12

The procedure of Example 10 was repeated except for using α-Al₂O₃ of an average particle size of 0.8 μm in place of α-Al₂O₃ of an average particle size of 0.2 μm, to prepare a video tape.

The obtained video tape was examined on friction coefficient of the surface of the magnetic recording layer after the first running and after the repeated running of 100 times, and squareness ratio. The results are set forth in Table 3.

In the running of the video tape on a video tape recorder, it was observed that guide poles of the video cassette encasing the vide tape had scratched. The guide polses of the video cassette were continuously in contact with the video tape on its surface of the magnetic recording layer.

COMPARISON EXAMPLE 13

The procedure of Example 10 was repeated except for using Cr₂O₃ of an average particle size of 0.3 μm in place of α-Al₂O₃ of an average particle size of 0.2 μμm. to prepare a video tape.

The obtained video tape was examined on friction coefficient of the surface of the magnetic recording layer after the first running and after the repeated running of 100 times, and squareness ratio. The results are set forth in Table 3.

In the running of the video tape on a video tape recorder, the color change of the guide poles was observed.

COMPARISON EXAMPLE 14

The procedure of Example 10 was repeated except for using the same amount of vinyl chloride/vinyl acetate copolymer containing no —COOH group in place of in place of the vinyl chloride/vinyl acetate/maleic anhydride copolymer containing —COOH group, to prepare a video tape.

The obtained video tape was examined on friction coefficient of the surface of the magnetic recording layer after the first running and after the repeated running of 100 times, and squareness ratio. The results are set forth in Table 3.

TABLE 3

|  | Squareness Ratio | Friction Coefficient (μ) | |
|---|---|---|---|
|  |  | After First Running | After 100-time Running |
| Example 10 | 0.85 | 0.29 | 0.29 |
| Example 11 | 0.87 | 0.26 | 0.28 |
| Example 12 | 0.87 | 0.26 | 0.28 |
| Example 13 | 0.87 | 0.26 | 0.28 |
| Example 14 | 0.87 | 0.27 | 0.29 |
| Example 15 | 0.86 | 0.27 | 0.29 |
| Com. Ex. 10 | 0.87 | 0.26 | 0.38 |
| Com. Ex. 11 | 0.80 | 0.32 | 0.37 |
| Com. Ex. 12 | 0.85 | 0.30 | 0.32 |
| Com. Ex. 13 | 0.87 | 0.40 | 0.30 |
| Com. Ex. 14 | 0.77 | 0.30 | 0.30 |

EXAMPLE 16

A video tape was prepared in the same manner as in Example 11 except for using a magnetic paint of the following components.

| | |
|---|---|
| Ferromagnetic metal fine powder (Fe 92 wt. %, Zn 4 wt. %, Ni 4 wt. %, specific surface area: 52.5 m²/g, saturation flux density 1530 Oe) | 100 parts |
| Vinyl chloride copolymer | 15 parts |
| Polyurethane resin | 10 parts |
| Polyisocyanate compound (Colonate L, Available from Japan Polyurethane Co., Ltd.) | 5 parts |
| α-Al₂O₃ (mean particle size: 0.2 μm) | 5 parts |
| Carbon black (Asahi #35, average particle size 115 mμ) | 2 parts |
| Oleic acid | 0.3 part |
| Stearic acid | 1.5 parts |
| Butyl stearate | 1 part |
| Methyl ethyl ketone | 250 parts |

The above-described vinyl chloride copolymer was the same as the vinyl chloride/vinyl acetate/maleic anhydride copolymer described in Example 10.

The above-described polyurethane resin had one —SO₃ group (unit) per 60,000 of the number-average molecular weight.

The obtained video tape was examined in the same manner to give a friction coefficient (p value) of the surface of the magnetic recording layer after the first running (0.25) and after the running of 100 times (0.27), and squareness ratio (0.85).

In the claims:

1. In a magnetic recording medium comprising a nonmagnetic support and a magnetic recording layer provided on the support, said magnetic recording layer comprising a ferromagnetic powder, a lubricant, a polyisocyanate compound and an abrasive, dispersed in a binder comprising a polyurethane resin and a vinyl chloride copolymer at a ratio between the polyurethane resin and the vinyl chloride copolymer in the range of 15:85 to 90:10, by weight, the improvement wherein:

said polyurethane resin has at least one polar group selected from the group consisting of —COOM, —SO₃M, —OSO₃M and —PO(OM')₂, wherein M is hydrogen or an alkali metal atom, and M' is hydrogen, an alkali metal atom or a lower hydrocarbon group, one polar group being contained per 53,000 to 100,000 of the number-average molecular weight of the polyurethane resin;

said vinyl chloride copolymer having at least one polar group selected from the group consisting of —COOM, —SO₃M, —OSO₃M and —PO(OM')₂, wherein M is hydrogen or an alkali metal atom, and M') is hydrogen, an alkali metal atom or a lower hydrocarbon group, one polar group unit being contained per 1,000 to 100,000 of the number-average molecular weight of the vinyl chloride copolymer;

said lubricant contains a fatty acid ester having a melting point of not higher than 30° C.; and said abrasive is α-alumina having an average particle size of not more than 0.5 μm.

2. The magnetic recording medium as claimed in claim 1, wherein said polyurethane resin has a number-average molecular weight in the range of 10,000 to 100,000.

3. The magnetic recording medium as claimed in claim 1, wherein said vinyl chloride copolymer has a number-average molecular weight in the range of 10,000 to 100,000.

4. The magnetic recording medium as claimed in claim 1, wherein said fatty acid ester is at least one fatty acid ester selected from the group consisting of butyl myristate, butyl stearate, ethyl palmitate, methyl myristate and butoxyethyl stearate.

5. The magnetic recording medium as claimed in claim 1, wherein said lubricant further contains a fatty acid having 12-22 carbon atoms.

6. The magnetic recording medium as claimed in claim 1, wherein said lubricant is contained in the magnetic recording layer in an amount of 0.1 to 10 parts by weight based on 100 parts by weight of the ferromagnetic powder.

7. The magnetic recording medium as claimed in claim 1, wherein said magnetic recording layer further contains carbon black having an average particle size in the range of 90 to 150 μm.

8. The magnetic recording medium as claimed in claim 1, wherein said ferromagnetic powder is Co-containing γ-FE₂O₃ having a specific surface area of not less than 35 m²/g, said specific surface area being measured according to BET method.

* * * * *